(12) United States Patent
Heyrani Nobari et al.

(10) Patent No.: US 9,923,846 B2
(45) Date of Patent: Mar. 20, 2018

(54) INSTANT SIMULTANEOUS MESSAGING (71) Applicants: Sadegh Heyrani Nobari, Innopolis (RU); Mozhdeh Vahabi Barzi, Innopolis (RU)

(72) Inventors: Sadegh Heyrani Nobari, Innopolis (RU); Mozhdeh Vahabi Barzi, Innopolis (RU)

( * ) Notice: Subject to any disclaimer, the term of this patent is extended or adjusted under 35 U.S.C. 154(b) by 0 days.

(21) Appl. No.: 15/183,832

(22) Filed: Jun. 16, 2016

(65) Prior Publication Data
US 2017/0366483 A1    Dec. 21, 2017

(51) Int. Cl.
*H04L 12/58* (2006.01)
(52) U.S. Cl.
CPC .............. *H04L 51/04* (2013.01); *H04L 51/10* (2013.01); *H04L 51/20* (2013.01)
(58) Field of Classification Search
None
See application file for complete search history.

(56) References Cited

U.S. PATENT DOCUMENTS

| 7,010,570 B1* | 3/2006 | Boies | G06Q 30/018 |
| | | | 705/317 |
| 2009/0265198 A1* | 10/2009 | Lester | G06Q 30/0185 |
| | | | 705/318 |
| 2013/0225212 A1* | 8/2013 | Khan | H04W 4/12 |
| | | | 455/466 |

* cited by examiner

*Primary Examiner* — Angela Nguyen (57) ABSTRACT

The present invention relates to a process that enables nearly real-time exchange of instant simultaneous messages between the users of a digital communication network. Instant Simultaneous Messaging enables "real" simultaneous exchange of contents between the users over a subject. This simultaneous exchange ensures that each user can access other users' contents with exactly the same order, e.g. privilege. Therefore, none of the users within a simultaneous conversion can be affected by other users' messages. The purpose of instant simultaneous messaging is to heal herd mentality by enforcing novelty/originality to the contents that are exchanged between the users. Therefore, while users are communicating over a subject simultaneously, a given user can not learn or get affected by other users' opinions before disclosing its own. The present invention provides a method and its apparatus for Instant Simultaneous Messaging between a sending user and a target user over a digital communication network.

20 Claims, 9 Drawing Sheets

INSTANT SIMULTANEOUS MESSAGING

The present invention relates to the process of exchanging Instant Simultaneous Messages in the Instant Messaging environment. The exchange of these instant simultaneous messages lets people to fairly communicate through instant messaging.

The present invention comprises of a method of exchanging instant simultaneous messages in a way that participants in this exchange are enjoying the same rights in terms of the order of messages.

In other words, the method of instant simultaneous messaging ensures that no participant has privilege over another due to expressing his/her message later or earlier. This results to improving "crowd wisdom" by healing the physiological phenomena called "herd mentality" and "bandwagon effect".

BACKGROUND OF THE INVENTION

The invention relates generally to Instant Messaging, a recently ubiquitous service. More particularly, the invention relates to techniques for enabling users to instantly exchange their messages, such as conversations, opinions or feedback that are not necessarily secure or sensitive, simultaneously in a simple and easy way.

Instant Messaging ("IM") is a form of digital communication in which messages are exchanged between users in near real-time [U.S. Pat. No. 7,720,082].

The proliferation of such a service has tremendously improved the efficiency and convenience of digital communications. Yet a problem endemic in instant messaging services is the need for simultaneous exchange of messages such that messages are exchanged between a fixed sending user and a fixed target user(s) with an exactly the same order.

In the existing form of exchange, the messages are ordered, e.g. by time or by appearance. As a result multiple messages cannot be exchanged with exactly the same order. From the user point of view the exchange order of messages is not necessarily about the precision/granularity of the time, e.g. seconds or milliseconds, but the order itself. This exchange order of messages should be simultaneous wherein the exchange order does not give privilege to a content.

However, due to the inherent order of messages in IM, there is a limit on the level of identity/novelty of such ordered messages. This can damage, e.g. substantially reducing the probability of, the novelty of the messages that has been exchanged after other messages. Since in IM, the later messages can be influenced by the earlier messages. The said damage can be that severe to reduce the probability of the originality of messages down to zero. This damage in psychology can be interpreted as "herd mentality" or "bandwagon effect".

The bandwagon effect is a psychological behaviour whereby people follow something mainly because other people are following it; Herd mentality, or mob mentality, explains the influence people are receiving from their peers. These physiological behaviours are materialized in IM when a user wants to expresses its opinion on a subject that some other users already expressed their opinions on the said subject and their opinions are available to the said user. This availability biased the said user to blindly align its opinion to the already expressed opinions. Therefore, overcoming the said limit has significant advantageous for avoiding a user to affect (an)other user(s) and hence improving crowd wisdom, decentralized decision making and group intelligent.

To avoid the said effects, we have to increase the said probability of the originality of messages. However, IM is unable to increase the said probability due to its inherent order of messages.

The term "instant simultaneous message" as used herein means an instant messaging that is structured to ensure that certain messages are exchanged with exactly the same order between a fixed sending user and a fixed target user(s).

In the case of daily conversations in IM, instant simultaneous message can ensure that the participants are exchanging their opinion about a subject at the same order without affecting each other using their mobile phones or web or computers.

Prior art has developed various approaches to overcome the simultaneous or fair electronic exchange in a general domain. The approaches are limited into two participants by cryptographic methods or electronic exchange protocols. The developed approaches are usually asking for some of the followings:

- adding more layers of complexity [U.S. Pat. No. 6,134,326]
- adding more rounds of transmission [Luby et al. in a paper titled "How to simultaneously exchange a secret bit by flipping a symmetrically-biased coin" in proc. of the 24th Annual Symposium on Foundations of Computer Science, 1983, pp 11-22]
- adding third fully-trusted [S. P. Ketchpel and H. Garcia-Molina in a paper titled "Making trust explicit in distributed commerce transactions" in proc. of the 16th International Conference on Distributed Computing Systems, 1996, pp 270-281] or semi-trusted parties [U.S. Pat. No. 6,263,436]
- unsatisfactory or hard to achieve assumptions in practice such as signing contracts [M. Blum in an article titled "How to exchange (secret) keys" in ACM Transactions on Computer Systems, vol. 1, No. 2, May 1983, pp. 175-193].

Nevertheless, the added layers or requested assumptions, such as the level of trustworthy of the participants, not only greatly increases the overhead but sometimes only merely procrastinate the originally requested guarantee that is needed for the instant simultaneous messaging.

Moreover, the focus of the above mentioned prior art is on the general case of electronic exchange, not exploiting IM properties, and/or is only between two participants, e.g. a single sending and a single target.

In addition, prior art has also developed approaches and interfaces for multiple sessions of instant messaging [U.S. patent application Ser. Nos. 11/047,144 and 09/727,182]. These approaches are overcoming the problem of performing multiple of the conventional Instant Messaging at a single time. However, these approaches cannot perform an instant simultaneous messaging, i.e. simultaneous communication between a fixed sending user and a fixed target user(s), that can heal the said herd mentality problem.

Instant Messaging contains returning users, i.e. not one-time users. This shows the intrinsic motivation of users to participate/interact with their preferred community of people, i.e. users are self-motivated to contribute. Furthermore, a user who avoids or breaks an instant simultaneous message in IM is not only losing any possible advantage such as accessing the existing simultaneously exchanged messages but also is punishable for its future use. However, the prior art is not taking into account any of these properties of IM, e.g. self-motivated, multiple exchanges of instant simultaneous messages, a history of instant simultaneous messages, and plurality of instant simultaneous messages as well as plurality of sending/target users.

Furthermore, users in IM have a kind of "social force", such as a motivation to contribute by expressing opinion or a business force that comes from a supervisor, that keeps users to voluntarily contribute. This force will reduce the probability of users to discontinue an instant simultaneous message in the middle of its process. Therefore, a complex method, such as the prior art, in this domain is an overestimation of the problem that diminishes the volunteer contribution of users.

OBJECTS OF THE INVENTION

In general, in the instant messaging communications we need to have a particular set of messages to be exchanged between a fixed sending user and a fixed target user(s) in an efficient and simple way that ensures the order of the messages within this set is not distinguishable, i.e. referred to as Instant Simultaneous Messaging in this invention. In this way we ensure that none of the messages in this set has been accessed before/after another message from the same set by any participant user. Therefore the messages that are in the same set are not affecting each other in any sense, since none of the users who participated in the exchange process of these instant simultaneous messages had access to a message before/after another.

In our invention we are taking advantage of the following properties of IM:
(a) self-motivated,
(b) multiple exchanges of instant simultaneous messages,
(c) a history of instant simultaneous messages and
(d) plurality of instant simultaneous messages as well as plurality of sending/target users.

It is an object of this invention to fully exploit the said properties of the IM by proposing an efficient method, i.e. Instant Simultaneous Messaging, accompanied with a system and its apparatus that will in part be apparent from the specification and drawings.

SUMMARY OF THE INVENTION

There is therefore a substantial need for a technique to overcome the aforementioned problems, e.g. herd mentality, in instant messaging, and in general in digital communication as well as in verbal, and provide an efficient solution.

This invention presents Instant Simultaneous Messaging ("ISM") that is a form of simultaneous exchange of messages through a communication network between a fixed sending user and a fixed target user(s) in an efficient and simple way. Since these messages are different from the IM messages in terms of being orderless, therefore to avoid confusion, the present invention refers to this set, an Instant Simultaneous Message (31) that contains multiple contents (37) and the contents are the orderless messages.

ISM in contrast to IM is a form of conversation that occur in a face-to-face verbal conversion unless employing a middle-ware/intermediate such as a third-person.

From U.S. patent application Ser. No. 09/727,182 an unified (multimedia) instant messaging is known. This known technique provides a nearly real-time exchange of multimedia messages and a processing of these messages through a flexible distributed system.

In view of the above-captioned prior art it is the object of the present invention to provide a technique for exchanging instant simultaneous messages.

The above object is achieved throughout the drawings, flowcharts, processes, methods, description and the features of the independent claims. The dependent claims further expands around the central idea of the present invention.

According to one aspect of the present invention there is provided a method for Instant Simultaneous Messaging between a sending user (33) and a target user (34) over a communication network via an intermediate (32). Said intermediate (32) is a computing system such as simple as a single processor or as large as a cloud based service or as comprehensive as a Unified Instant Messaging System (UIMS). The method is comprising of four sequential principle steps (S1-S4) as the following:

(S1) First, the said sending user (33) opens an instant simultaneous messaging application having an instant simultaneous message (31) composition region at a terminal to fill out the components of the instant simultaneous message. Said components are sending and target users' particulars, i.e. user identification, a subject (36) and two contents (37), one for the sending user and one for the target user. Said terminal is a computer, mobile device, tablet or any other human-computer interface. Said sending user fills all the components of the instant simultaneous message except the target user's content and sends it to the intermediate (32);

(S2) Second, the said intermediate (32) sends the instant simultaneous message (31) to the target user (34) wherein the content of the sending user is hided from the target user (34);

(S3) Third, the said target user (34) then fills the target user's content (37) of the received instant simultaneous message (31) according to its subject (36) and returns it to the intermediate (32);

(S4) Finally, the said intermediate (32) simultaneously sends the complete instant simultaneous message (31) that has all the contents (37), sending and target users' contents, to both the sending user and the target user.

In one embodiment, plurality of target users (35) can exist. In this embodiment, said instant simultaneous message (31) in addition to its existing components comprises of one content for each target user. The method is then between these three parties, i.e. a sending user, multiple target users and an intermediate, and comprises a process of four sequential steps ordered from (S1) to (S4) as the following:

(S1) The method is initiated by the sending user (33), when the sending user wants to exchange the said instant simultaneous message (31). First, the sending user forms/fills the instant simultaneous message components except the target users' content (37) and sends it to the said intermediate via the said network;

(S2) Second, said intermediate (32) sends the instant simultaneous message (31) to all the target users (35) wherein the content of the sending user is hided from the target users (34);

(S3) Third, each target user needs to respond to the instant simultaneous message in step S2 via the intermediate. Therefore each target user fills/forms its own content (37), i.e. target user's content of the instant simultaneous message (31) according to its subject (36), and sends the updated instant simultaneous message to the intermediate;

(S4) Finally, after the intermediate collects the updated instant simultaneous messages from all of the target users in step (S3), only then the intermediate (32) will instantly exchange/send the instant simultaneous message with all of its components filled between the sending user (33) and the target users (35).

In one embodiment, said sending/target user can be a plurality of users. Therefore this plurality can be a group of users associated with a single sending/target user wherein the group of users are filling a single sending/target user's content.

In one embodiment, said terminal is a computer device, such as a PC or a laptop. In another embodiment, said terminal is a mobile device. In another embodiment, said terminal is a tablet.

In one embodiment, said users, i.e. sending (33) and target (34), are associated with a proportional value that reflects their history of making such simultaneous messaging, named reliability. The following equation calculates a simple reliability value:

$$R_i = \frac{S_i}{S_i + U_i} \quad (1)$$

In equation (1) $R_i$ is a simple reliability measure for user i such that this user made $S_i$ number of successful instant simultaneous messages, i.e. finished all the steps of the instant simultaneous message, and in contrast $U_i$ is the number of unsuccessful instant simultaneous messages, i.e. not all the steps of the instant simultaneous message have been passed. This equation can become more sophisticated/comprehensive, for example taking into account the similar measurement from the users that the user i had instant simultaneous messaging with before to the user's i reliability. Furthermore, since this equation is normalized, the value of this equation can be shown as a rating measure with stars or other shapes.

In one embodiment, said instant simultaneous messaging application is a web application. In another embodiment, said instant simultaneous messaging application is a native application on a terminal. In another embodiment, said instant simultaneous messaging application is embedded as a service within an existing instant messaging application or social sharing platform.

In one embodiment, said steps can be merged into each other while preserving the condition that the content (37) of the sending user is fully accessible to the target user if and only if the content of the target user is already obtained and vice versa.

Preferably, the method further comprises the step of letting the sending user (33) to fill its own content at a later time than sending the instant simultaneous message (31) to the intermediate (32) but earlier than receiving the contents of the target user.

In one embodiment, said intermediate (32) can stand on its own as a third party computing device. In another embodiment said intermediate can be dissolved into the sending and target users' terminals.

In one embodiment, said hiding of the content in step (S2) can be achieved by a complete removal of the content and in another embodiment by a a partial removal of the content with less damage than that of a complete removal.

In one embodiment, said instant simultaneous message (31) components can be inferred. In another embodiment, said components can be customized by the sending user. In another embodiment, some of the said components can be avoided arbitrarily.

In one embodiment, said instant simultaneous message (31) components some or all are tagged with the date and/or the location and/or the status, i.e. delivered or seen.

In one embodiment, said subject (36) is a text. In another embodiment, said subject is a video. In another embodiment, said subject is an image or a photo. In another embodiment, said subject is an audio. In another embodiment, said subject is a combination of above.

In one embodiment, said content (37) is a text. In another embodiment, said content is a video. In another embodiment, said content is an image or a photo. In another embodiment, said content is an audio. In another embodiment, said content is a combination of above.

In one embodiment, said instant simultaneous messaging can be embedded as a service for providing instant simultaneous messaging within an existing social sharing platform or IM that can take advantage of the ISM accordingly.

According to another aspect of the present invention there is provided a method for instant simultaneous messaging (31) between a sending user (33) and a target user (34), without an intermediate, over an instant messaging platform. An instant simultaneous message (31) comprises of the following components: sending (33) and target (34) users' particulars, i.e. user identification, a subject (36) and two contents (37), one for the sending user and one for the target user. The subject (36) and the contents (37) comprise of a text or a media or a combination of both, and are tagged with a date or a location or a delivery status or a combination of any. Said text being a question, comment, a review, an opinion or a feedback and said media being a photo, a video or an audio. Said delivery status being status such as delivered or seen.

The method is between two parties, i.e. a sending user (33) and a target user (34), and comprises a process of three sequential steps ordered from (S1) to (S3) as the following that results to an instant simultaneous exchange of the contents (37) directly between the sending user (33) and the target user (34) over a subject (36):

(S1) The method is initiated by the sending user (33), when the sending user wants to exchange the said instant simultaneous message (31). First, the sending user forms/fills the components of the instant simultaneous message (31) except the contents of the sending user (33) and the target user (34), then this instant simultaneous message without its said contents (37) will be sent to the target user;

(S2) Second, the sending user (33) needs to write the sending user's content (37) of the sent instant simultaneous message (31) according to its subject (36) and encrypt (38) it with a unique private key (39) that solely belongs to this sending user's content (37). Then, the sending user (33) sends its encrypted (38) content to the target user (34). Concurrently, the target user (34) needs to write the target user's content (37) of the received instant simultaneous message (31) according to its subject (36) and encrypt (38) it with a unique private key (39) that solely belongs to this target user's content. Then, the target user (34) sends its encrypted (38) content to the sending user (33);

(S3) Finally, whenever the target user (34) received the encrypted (38) sending user's content of this instant simultaneous message (31), the target user (34) will send its unique private key (39), that belongs to the encrypted (38) target user's content, to the sending user (33). Concurrently, whenever the sending user (33) received the encrypted target user's content (38) of this instant simultaneous message (31), the sending user (33) will send its unique private key (39), that belongs to the encrypted (38) sending user's content, to the target user (34).

In one embodiment, plurality of target users (35) can exist. In this embodiment, said instant simultaneous message (31) in addition to its existing components comprises of one content for each target user.

The method is between these two parties, i.e. a sending user (33) and multiple target users (35), that comprises a process of three sequential steps ordered from (S1) to (S3) as the following:

(S1) The method is initiated by the sending user (33), when the sending user wants to exchange the said instant simultaneous message (31). First, the sending user forms/fills the components of the instant simultaneous message except the contents of the sending user (33) and target users (35), this instant simultaneous message without its said contents will be sent to all the target users (35);

(S2) Second, the sending user (33) needs to write the sending user's content (37) of the sent instant simultaneous message (31) according to its subject (36) and encrypt (38) the content with a unique private key (39) that solely belongs to this sending user's content. Then, the sending user (33) sends its encrypted (38) content to all the target users (35). Concurrently, each target user (35) needs to write its own target user's content (37) of the received instant simultaneous message according to its subject (36) and to encrypt (38) it with a unique private key (39) that solely belongs to its target user's content. Then, each target user (35) sends its encrypted (38) content to the sending user (33) and the other target users (35);

(S3) Finally, whenever any user A, either sending or any target, received the encrypted (38) content of any other user B, either sending or any target, for this instant simultaneous message (31), the user A will send its unique private key (39), that belongs to the user A's encrypted (38) content, to the user B.

BRIEF DESCRIPTION OF THE DRAWINGS

For a more complete understanding of the invention, reference is made to the following description and accompanying drawings, in which.

DETAILED DESCRIPTION OF THE FIGURES

Figure 1:
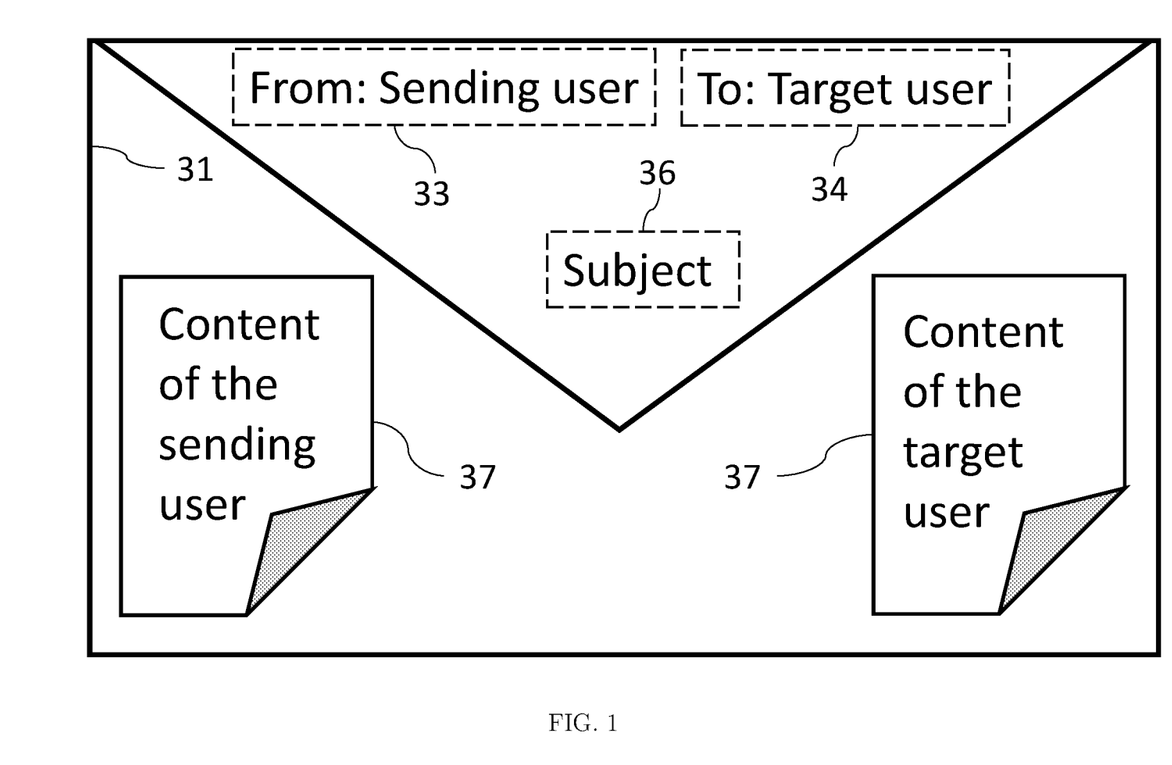
FIG. 1 Shows the internal components of an Instant Simultaneous Message.

FIG. 1 shows the internal components of an Instant Simultaneous Message. An Instant Simultaneous Message (31) consists of the following five components: a sending (33) and a target (34) users' particulars, i.e. user identification, in the "From" and "To" places illustrated in the figure; A subject (36) that the users are exchanging the instant simultaneous message based on; And two contents (37), one for the sending (33) and one for the target (34) user, that are disclosed to the users through the proposed principle steps.

Figure 2:
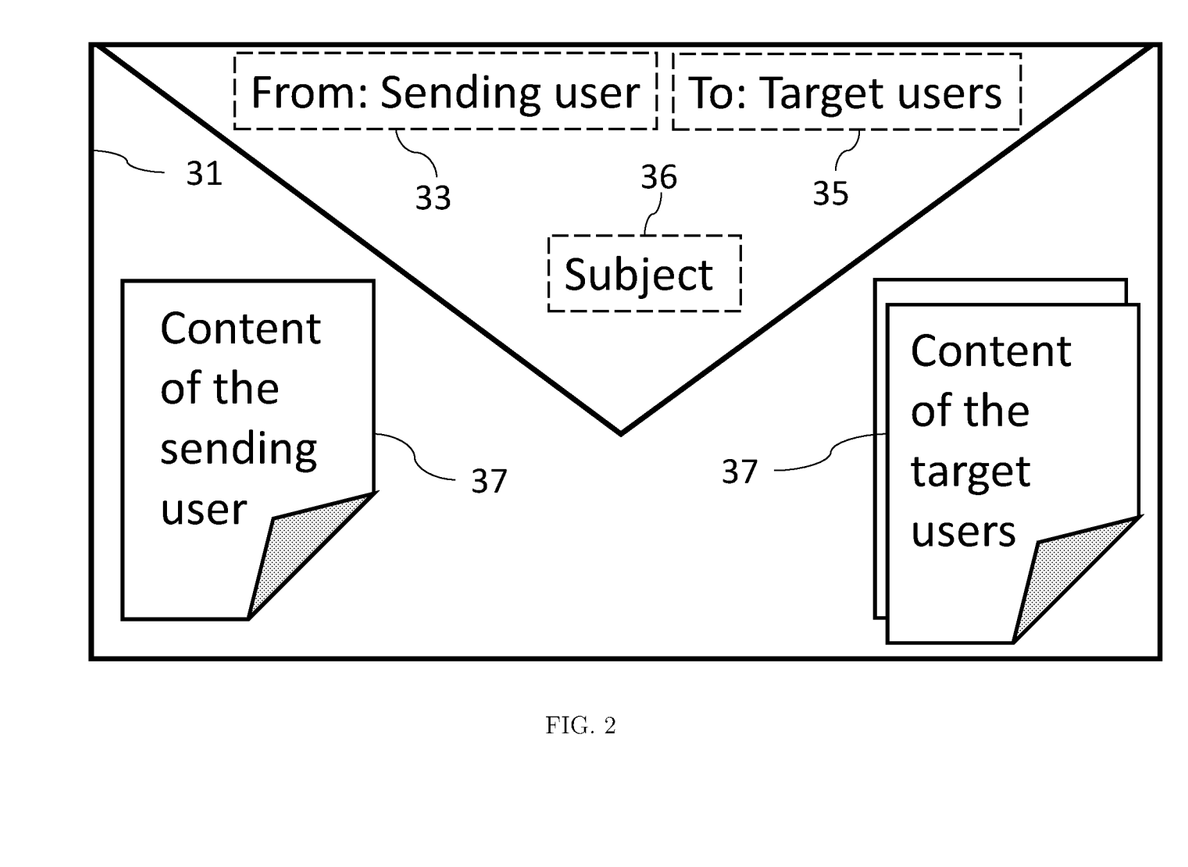
FIG. 2 Shows the internal components of a Plural Instant Simultaneous Message.

FIG. 2 shows the internal components of a Plural Instant Simultaneous Message. This message differs from the message in FIG. by having multiple target users (35) as well as multiple contents (37), one for each target user.

Figure 3:
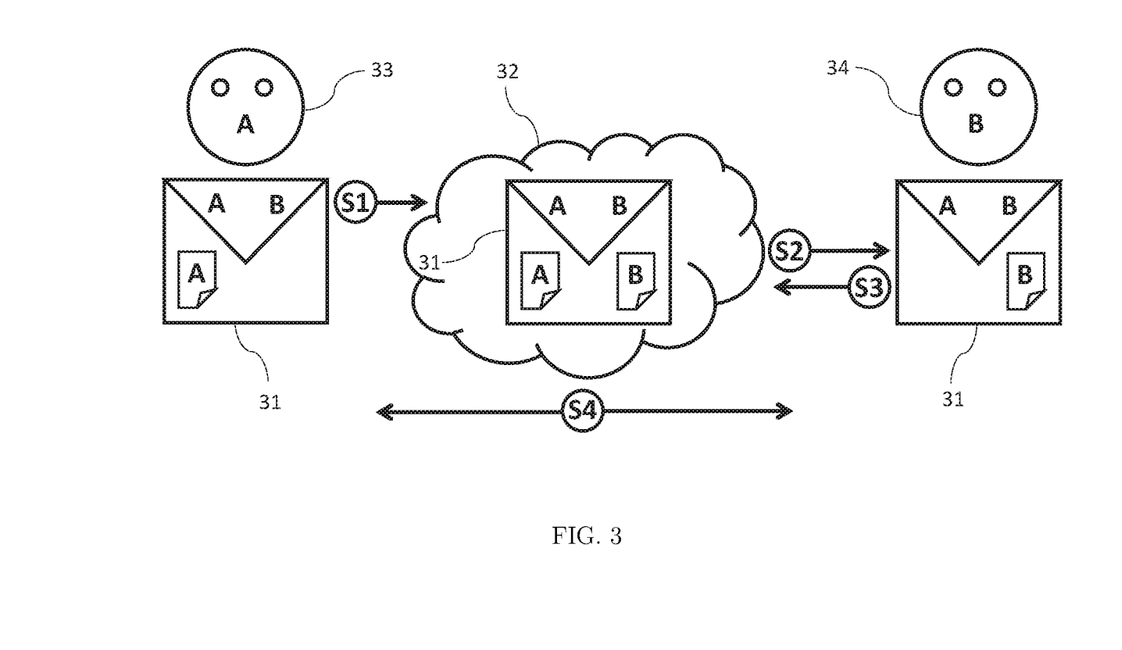
FIG. 3 Shows the process of exchanging an Instant Simultaneous Message.

FIG. 3 shows the structure as well as the four principle steps of the process of exchanging an Instant Simultaneous Message ("ISM") with an Intermediate (32). The overall structure of the ISM consists of a sending user (33) and a target user (34) that are instantly exchanging an instant simultaneous message (31) via an intermediate (32). Said intermediate (32) is a computing system such as simple as a single processor or as large as a cloud based service or as comprehensive as a Unified Instant Messaging System (UIMS). The intermediate grants the participant users, i.e. sending and target users, access to the said instant simultaneous message (31) only through the following four principle steps ordered/illustrated from (S1) to (S4):

(S1) First, the sending user (33) forms/fills the components of the instant simultaneous message, except the target user's content, and sends it to the intermediate (32);

(S2) Second, the intermediate (32) first hides the sending user's content from the received instant simultaneous message and sends it to the target user (34);

(S3) Third, given the subject (36) of the received instant simultaneous message (31), the target user (34) fills/forms its own content, i.e. target user's content (37), of the instant simultaneous message (31) and returns it to the intermediate (32);

(S4) Finally, the intermediate (32) instantly sends the complete instant simultaneous message (31), with all of its components, to the sending user (33) and the target user (34).

Figure 4:
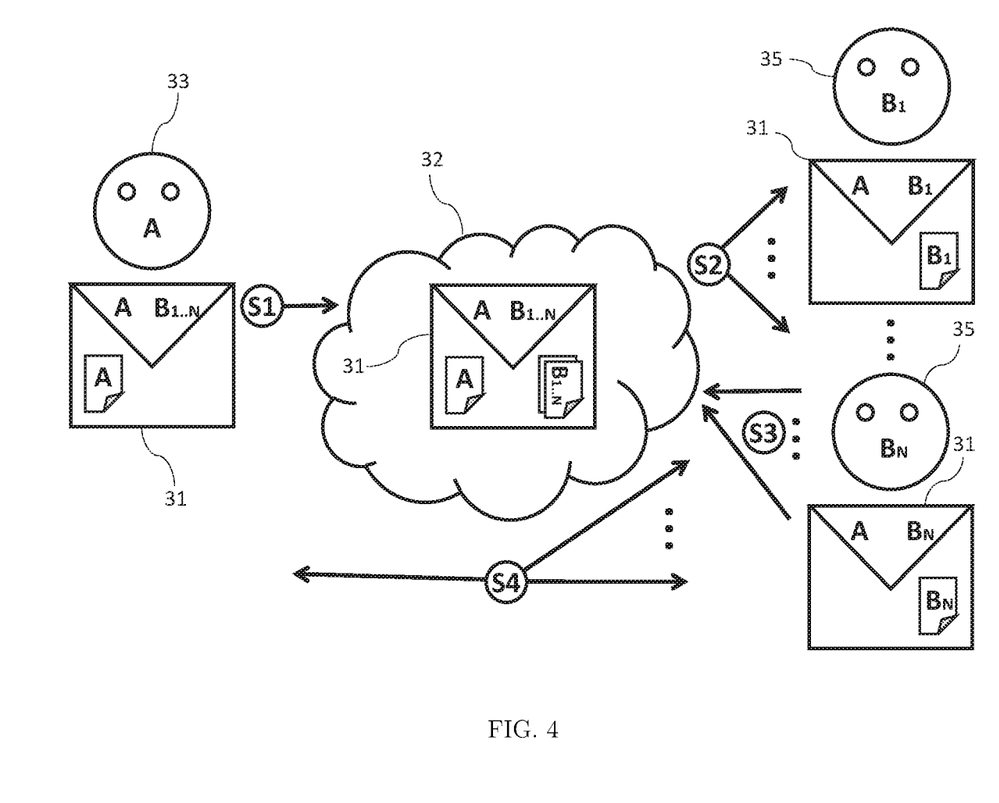
FIG. 4 Shows the process of exchanging a Plural Instant Simultaneous Message.

FIG. 4 shows the structure as well as the four principle steps of the process of exchanging a Plural Instant Simultaneous Message. This figure differs from FIG. 1 by having multiple target users (35) as well as multiple contents (37), one for each target user. The four principle steps of the exchange process in this figure are accordingly updated as following:

(S1) The sending user (33) forms/fills the components of the instant simultaneous message (31), except the target users' content (37), and sends it to the intermediate (32);

(S2) The intermediate (32) first hides the sending user's content (37) from the received instant simultaneous message (31) and sends it to all the target users (35);

(S3) Given the subject (36) of the received message, each target user (35) fills/forms its own content (37), i.e. target user's content, of the instant simultaneous message (31) and returns it to the intermediate (32);

(S4) The intermediate (32) instantly sends the complete instant simultaneous message (31), with all of its components, to the sending user (33) and all the target users (35).

Figure 5:
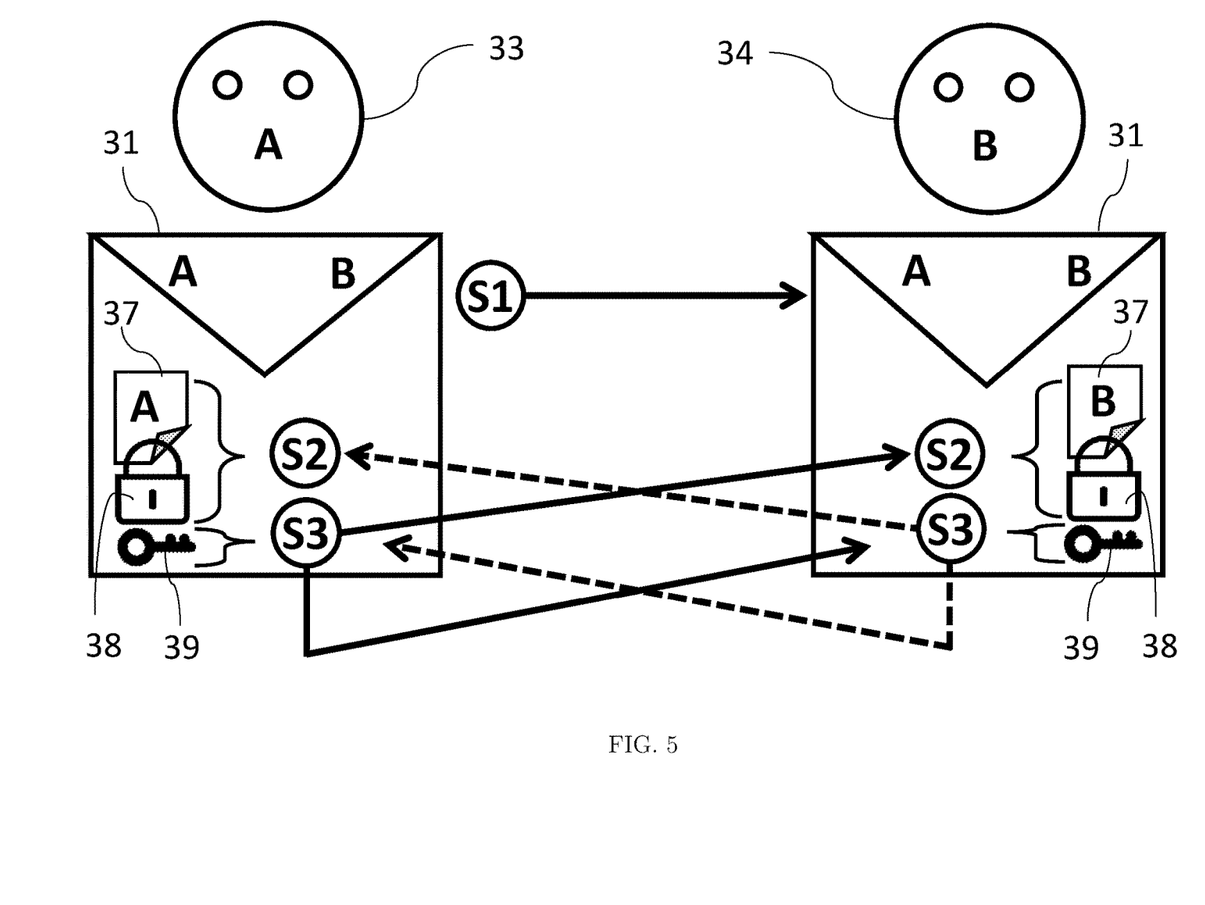
FIG. 5 Shows the process of exchanging an Instant Simultaneous Message without an intermediate.

FIG. 5 shows the structure as well as the three principle steps of the process of exchanging an Instant Simultaneous Message ("ISM") without an Intermediate (32). The overall structure of the ISM consists of a sending user (33) and a target user (34) that are instantly exchanging an instant simultaneous message (31) directly between each other. The users are exchanging this message through a process of three principle steps ordered/illustrated from (S1) to (S3) as the following:

(S1) The process is initiated by the sending user (33), when the sending user wants to exchange the said instant simultaneous message (31). First, the sending user forms/fills the components, e.g. the subject (36), of the instant simultaneous message except the contents (37) of the sending (33) and target (34) users, this instant simultaneous message that has none of the said contents will be sent to the target user (34);

(S2) Second, the sending user (33) needs to write the sending user's content (37) of the sent instant simultaneous message (31) according to its subject (36) and encrypt (38) it with a unique private key (39) that solely belongs to both the sent instant simultaneous message (31) and the sending user (33). Then, the sending user (33) sends its encrypted content (38) to the target user (34). Concurrently, the target user (34) needs to write the target user's content (37) of the received instant simultaneous message according to its subject (36) and encrypt (38) it with a unique private key (39) that solely belongs to both the received instant simultaneous message (31) and the target user (34). Then, the target user (34) sends its encrypted content (38) to the sending user (33);

(S3) Finally, whenever the target user (34) received the encrypted content (38) of the sending user (33) for this message, the target user (34) will send its unique private key (39), the key that both belongs to this instant simultaneous message (31) and the target user (34), to the sending user (33). Concurrently, whenever the sending user (33) received the encrypted content (38) of the target user (34) for this message, the sending user (33) will send its unique private key (39), the key that both belongs to this instant simultaneous message (31) and the sending user (33), to the target user (34).

Figure 6:
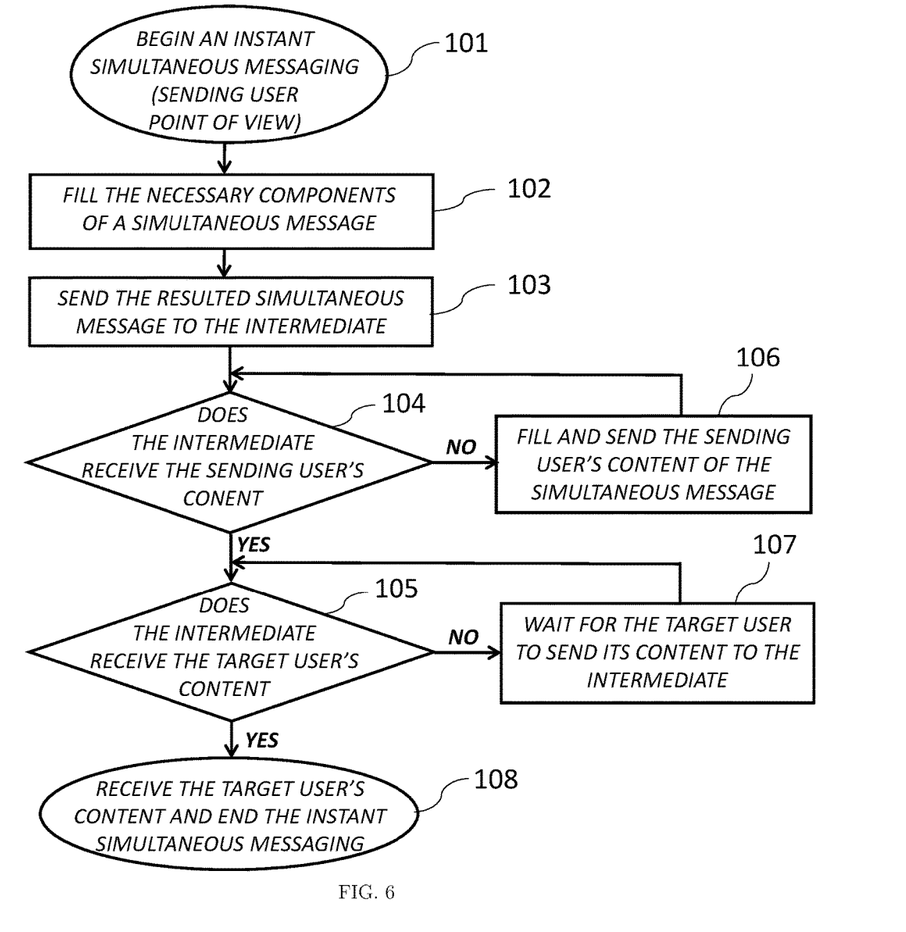
FIG. 6 Shows the flow diagram of a process of exchanging an Instant Simultaneous Message from the point of view of a sending user in accordance with the present invention.

FIG. 6 illustrates a method for processing an instant simultaneous message (31) from the point of view of a sending user (33). A sending user, the initiator of the process of exchanging an instant simultaneous message (31), starts the process in block 101. This user will fill the necessary components of the instant simultaneous message (31) in block 102. The said necessary components for one embodiment are all the components of the instant simultaneous message except target user's content (37). For another embodiment the requirements can be relaxed or can be identified based on the availability of historical data from the sending user. Afterwards, in block 103, the sending user sends the filled instant simultaneous message (31) to the intermediate (32). In one embodiment, some conditions, such as content analysis, can be enforced after block 102 to ensure that the sending user is meeting the conditions. After sending, in decision block 104, the intermediate checks if the sending user has filled its own content (37): If not, the sending user will remain in this decision block until the intermediate receives the sending user's content of the instant simultaneous message form block 106; If YES, the intermediate will check the target user's content in decision block 105. If the intermediate has not yet received the target user's content, the sending user will remain in decision block 105 until the intermediate receives the content (37) of the target user (34) in block 107. Finally, when the intermediate (32) received the both contents (37), the sending user's content and the target user's content, in block 108, the sending user will receive the content of the target user (34) from the intermediate (32). In an embodiment, similarly plurality of target users (35) can be applied to the illustrated process.

Figure 7:
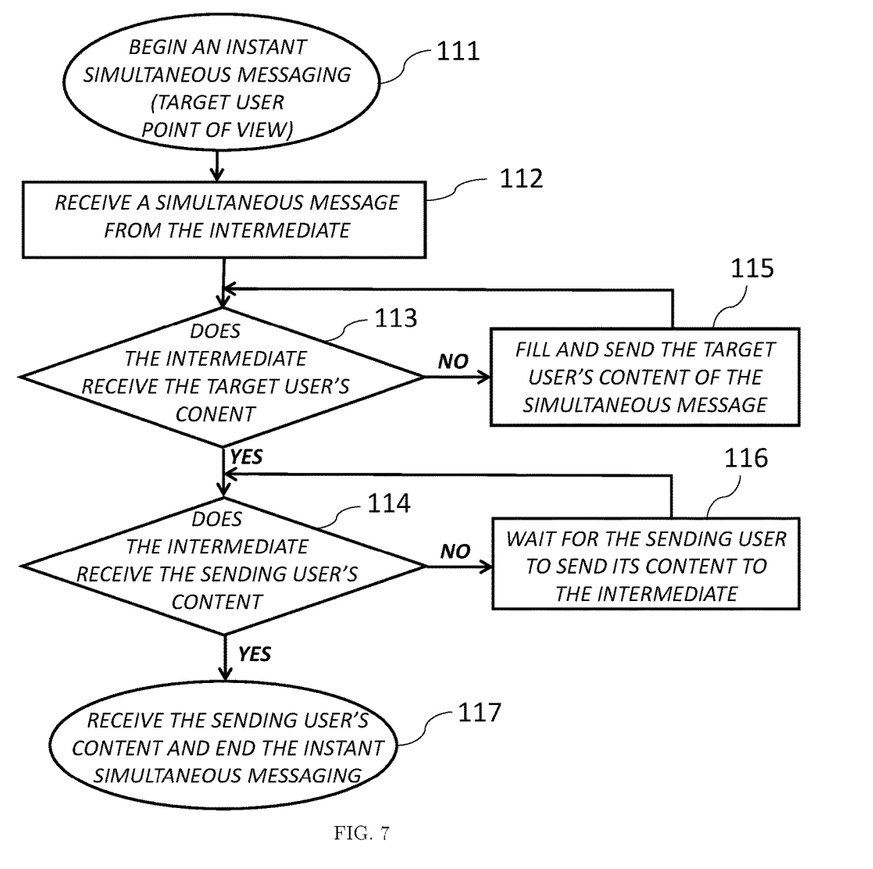
FIG. 7 Shows the flow diagram of a process of exchanging an Instant Simultaneous Message from the point of view of a target user in accordance with the present invention.

FIG. 7 illustrates a method for processing an instant simultaneous message (31) from the point of view of a target user (34). A target user, who has been requested to participate in an instant simultaneous message (31) from a sending user (33), starts the process in block 111. This user after receiving a instant simultaneous message (31) from the intermediate (32) in block 112 needs to reply to this message by filling the target user's content (37) of the received instant simultaneous message (31) according to its subject (36) in block 115. If the intermediate (32) receives the contents of the target user in decision block 113, the target user will wait for the sending user's content (37) in block 166 until the requirement of the decision block 114 has met. In one embodiment, some conditions, such as content analysis, can be enforced within decision blocks 113-114 to ensure that the target user (34) is meeting the conditions. Finally, when the intermediate has the contents (37) of the both sending user (33) and target user (34), in block 117, the target user will receive the content of the sending user (33) from the intermediate (32). In an embodiment, similarly plurality of target users (35) can be applied to the illustrated process.

Figure 8:
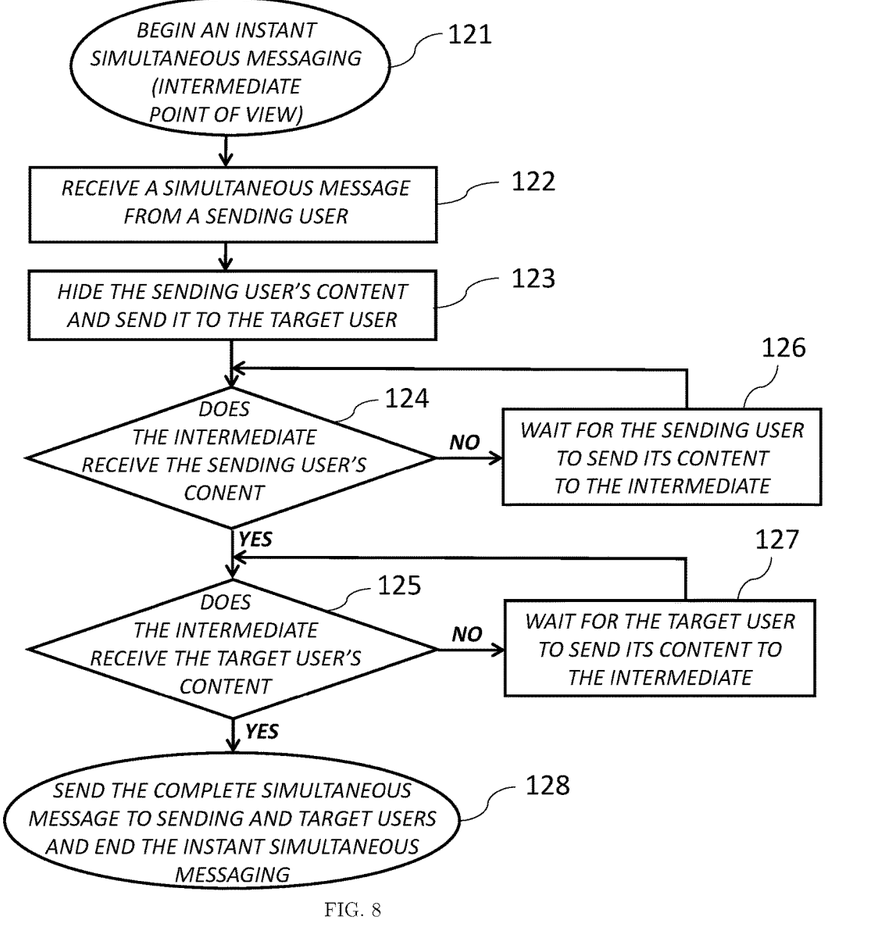
FIG. 8 Shows the flow diagram of a process of exchanging an Instant Simultaneous Message from the point of view of an intermediate in accordance with the present invention.

FIG. 8 illustrates a method for processing an instant simultaneous message (31) from the point of view of an intermediate (32). The intermediate, the middle-ware in the exchange process of an instant simultaneous message, starts the process in block 121. When the intermediate receives an instant simultaneous message (31) from a sending user (33), in block 122, will hide the sending user's content of the received instant simultaneous message and send it to the indicated target user (34) of the instant simultaneous message (31) in block 123. If the intermediate has not yet received the content of the sending user, in decision block 124, the intermediate waits for the sending user's content in block 126, otherwise the intermediate checks the recipient of the target user's content in decision block 125. If the intermediate has not yet received the target user's content, it will wait for receiving the target user's content in block 127 otherwise will move to the final block, i.e. 128. In this block the intermediate (32) has received the contents of the both sending user (33) and target user (34), so the intermediate sends to both users the complete instant simultaneous message, i.e. an instant simultaneous message (31) that has all its components filled by all its participants, and finishes the processing of this instant simultaneous message. In one embodiment, within decision blocks 124-125, further constraints can be enforced to the contents of the sending user (33) and/or the target user (34) to check if the contents are relevant to each other or to the subject (36) of the exchanging instant simultaneous message. In an embodiment, similarly plurality of target users (35) can be applied to the illustrated process.

Figure 9:
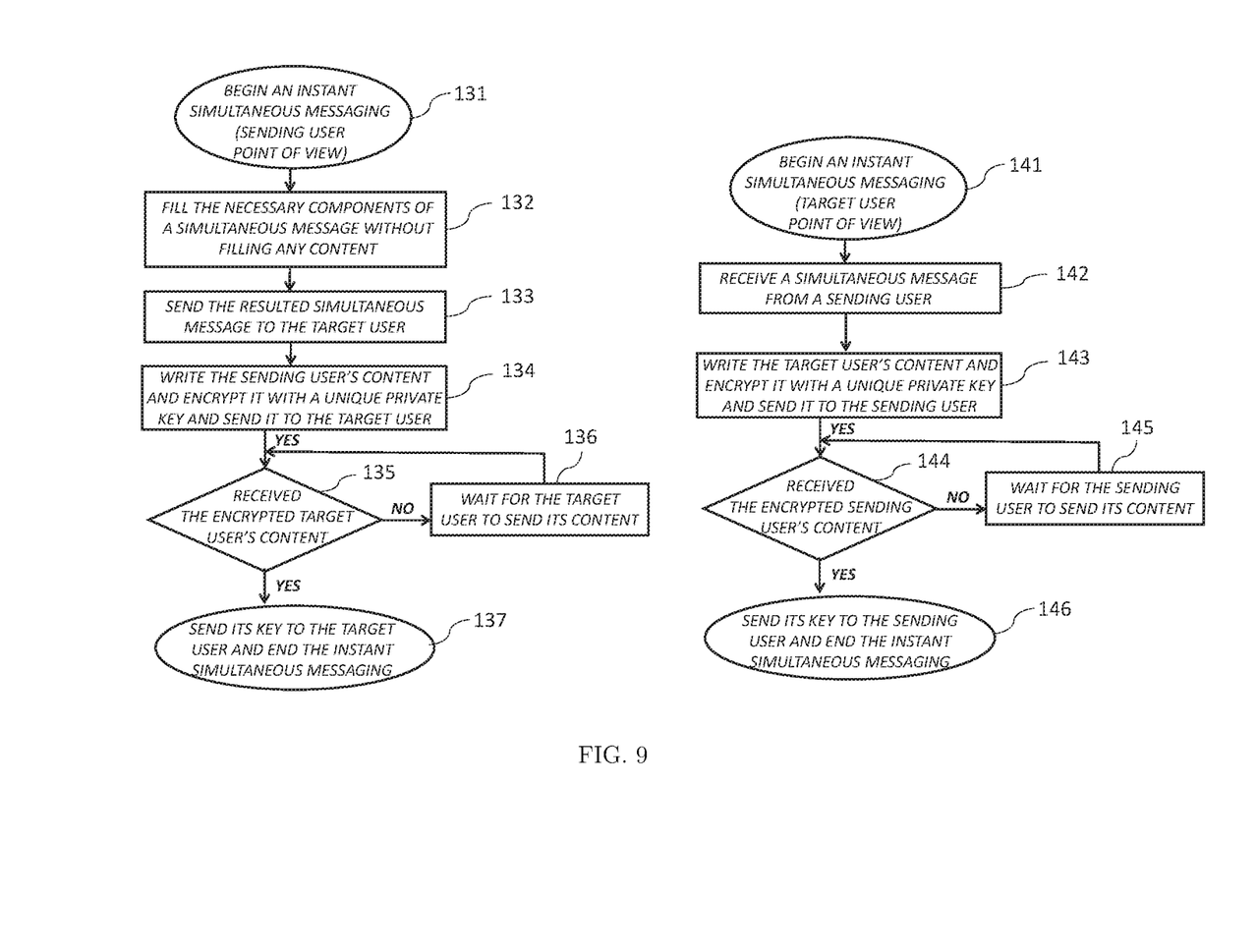
FIG. 9 Shows the flow diagrams of a process of exchanging an Instant Simultaneous Message between a sending and a target user directly, without an intermediate.

FIG. 9 illustrates a method for processing an instant simultaneous message (31) from the point of view of a sending user (33) and a target user (34), separately, when they communicate directly, without an intermediate. Following explains the process of the sending user (33) and the target user (34), respectively:

The sending user (33), the initiator of the process of exchanging an instant simultaneous message (31), starts the process in block 131. This user will fill the necessary components of the instant simultaneous message (31) in block 132 without filling any content (37) and will send it to the target user (34) in block 133. The said necessary components for one embodiment are all the components of the instant simultaneous message except its contents (37). For another embodiment the requirements can be relaxed or can be identified based on the availability of historical data from the sending user (33). Afterwards, in block 134, the sending user writes its sending user's content and encrypts (38) it with a unique private key (39) that solely belongs to this sending user's content and sends its encrypted (38) content to the target user (34). In one embodiment, some conditions, such as content analysis, can be enforced after block 134 to ensure that the sending user is meeting the conditions. After sending, in decision block 135, the sending user checks whether the target user has sent the encrypted (38) target user's content of the instant simultaneous message. If NO, the sending user (33) waits for the target user's content in block 136, otherwise the sending user, in block 137 sends its private key (39) for its encrypted (38) sending user's content (37) to the target user and ends the process.

The target user (34), who has been requested to participate in an instant simultaneous message (31) from the sending user (33), starts the process in block 141. This user after receiving an instant simultaneous message (31) from the sending user (33) in block 142 needs to reply to this message by writing the target user's content (37) of the received instant simultaneous message (31) according to its subject (36) in block 143. After writing the target user's content, the target user encrypts it with a unique private key (39) that solely belongs to this target user's content and sends its encrypted (38) content to the sending user. In one embodiment, some conditions, such as content analysis, can be enforced after this block to ensure that the target user (34) is meeting the conditions. After sending, in decision block 144, the target user checks whether the sending user has sent the encrypted (38) sending user's content of the instant simultaneous message. If NO, the target user (34) waits for the encrypted (38) sending user's content in block 145, otherwise the target user, in block 146 sends its private key (39) for its encrypted (38) target user's content (37) to the sending user and ends the process. In an embodiment, similarly plurality of target users (35) can be applied to the illustrated process.

The embodiments of the invention in which an exclusive property or privilege is claimed are as follows:

1. A method for exchanging instant simultaneous messages (31) between a sending user (33) and plurality, from one to many, of target users (35) via an intermediate (32):
    said intermediate (32) is a Unified Instant Messaging System (UIMS) or a computing unit or a cloud based system;
    said instant simultaneous message (31) including a sending (33) and plurality of target (35) users' particulars, a subject (36) and multiple contents (37), one for the sending user (33) and one for each of the target users (35);
    wherein said users' particulars including user identification;
    wherein said subject (36) and said contents (37) including a text or a media or a combination of both;
    wherein said text including question, comment, review, opinion or feedback and said media including photo, video or audio;
    wherein said text and said media are associated with a date when the said sending user (33) submits the said instant simultaneous message (31), or a location where the said sending user (33) submits the said instant simultaneous message (31), or a delivery status, or a combination of any;
    wherein said delivery status determines if the said instant simultaneous message (31) is sent, delivered or received and has been seen by whom including the said sending user (33), each of the said target users (35) and the said intermediate (32);
    said sending user sends all the components of the instant simultaneous message except the contents of target users (37) to the said intermediate (32) via the said network;
    said intermediate (32) hides the content (37) of the sending user (33) and sends the resulted instant simultaneous message (31) to all the target users (35) wherein said resulted instant simultaneous message including the received instant simultaneous message from the sending user without the sending user's content;
    said target users (35) each sends its own content (37) according to the subject (36) to the intermediate (32) and the said content including target user's content of the instant simultaneous message (31);
    said intermediate (32) is continuing to receive contents of the said instant simultaneous message (31) from each of the target users (35) initially indicated by the said sending user and for each received said content of the said instant simultaneous message (31) from any of the target users updates the sending user and those target users who already sent their said content of the said instant simultaneous message (31) to the intermediate with the said received content.

2. The method as recited in claim 1, further comprising additional conditions to the instant simultaneous message (31) including computer instructed constraints or human controls or physical constraints or a combination of any wherein said physical constraints including expiry time.

3. The method as recited in claim 1, further comprising additional order to the method of the instant simultaneous message (31), said order including a user determined order of exchange of the contents (37).

4. The method as recited in claim 1, further comprising an interference of instant messages within the instant simultaneous message (31).

5. The method as recited in claim 1, further comprising a dynamic number of target users wherein the said dynamism including a growing or a shrinking number or a sending user indicated number or a target user indicated number or a formulated number wherein said formulated number including a realtime generated number or a conditional number.

6. The method as recited in claim 1, further comprising a score associated to each user; the said score including the number of times each user participates in simultaneous instant messaging (31).

7. The method as recited in claim 1, wherein further compressing the instant simultaneous message (31), said compression including efficiency techniques or reducing the number of reciprocates between the users and the intermediate.

8. The method as recited in claim 1, wherein further enhancing the intermediate to suggest actions to the users, said actions including terminating or replying or suggesting answers.

9. The method as recited in claim 1, wherein communicating the instant simultaneous message (31) in an instant messaging application.

10. The method as recited in claim 1, further comprising additional time for the sending user (33) to send its content (37) to the intermediate, said time lasts until when the sending user is willing to receive the target users' content.

11. The method as recited in claim 10, further comprising additional delay to the said intermediate (32) for when the intermediate updates the sending and target users wherein said delay including waiting for receiving responses from the users including the sending and target users.

12. The method as recited in claim 10, further comprising additional number that indicates the number of target users (35) whose response to the said intermediate (32) is sufficient for the intermediate to update all the users, both sending user and target users, with the contents.

13. The method as recited in claim 10, further comprising swapping between the sending user and a target user among the target users within the method.

14. A method for exchanging instant simultaneous messages (31) between a sending user (33) and plurality, from one to many, of target users (35):
   said instant simultaneous message (31) including a sending (33) and plurality of target (35) users' particulars, a subject (36) and multiple contents (37), one for the sending user (33) and one for each of the target users (35);
   wherein said users' particulars including user identification;
   wherein said subject (36) and said contents (37) including a text or a media or a combination of both;
   wherein said text including question, comment, review, opinion or feedback and said media including photo, video or audio;
   wherein said text and said media are associated with a date when the said sending user (33) submits the said instant simultaneous message (31), or a location where the said sending user (33) submits the said instant simultaneous message (31), or a delivery status or a combination of any;
   wherein said delivery status determines if the said instant simultaneous message (31) is sent, delivered or received and has been seen by whom including the said sending user (33), each of the said target users (35);
   said sending user sends all the components of the instant simultaneous message except the said contents to all the said target users;
   said target users (35) and the said sending user, each sends its own encrypted content (37) of the instant simultaneous message to all the other users, from the said sending user and said target users;
   a pair of users, from the said sending user and said target users, will exchange their encryption key of their encrypted content with each other once each received the encrypted content of the other user.

15. The method as recited in claim 14, further comprising additional conditions to the instant simultaneous message (31) including computer instructed constraints or human controls or physical constraints or a combination of any wherein said physical constraints including expiry time.

16. The method as recited in claim 14, wherein communicating the instant simultaneous message (31) in an instant messaging application.

17. The method as recited in claim 14, further comprising an interference of instant messages within the instant simultaneous message (31).

18. The method as recited in claim 14, further comprising additional order to the method of the instant simultaneous message (31), said order including a user determined order of exchange of the contents (37).

19. A set of instructions on a non-transitory computer-readable storage medium that when executed on at least one processor results to exchanging instant simultaneous messages (31) between a sending user (33) and plurality, from one to many, of target users (35) via an intermediate (32):
   said intermediate (32) is a Unified Instant Messaging System (UIMS) or a computing unit or a cloud based system;
   said instant simultaneous message (31) including a sending (33) and plurality of target (35) users' particulars, a subject (36) and multiple contents (37), one for the sending user (33) and one for each of the target users (35);
   wherein said users' particulars including user identification;
   wherein said subject (36) and said contents (37) including a text or a media or a combination of both;
   wherein said text including question, comment, review, opinion or feedback and said media including photo, video or audio;
   wherein said text and said media are associated with a date when the said sending user (33) submits the said instant simultaneous message (31), or a location where the said sending user (33) submits the said instant simultaneous message (31), or a delivery status or a combination of any;
   wherein said delivery status determines if the said instant simultaneous message (31) is sent, delivered or received and has been seen by whom including the said sending user (33), each of the said target users (35) and the said intermediate (32);
   said sending user sends all the components of the instant simultaneous message except the contents of target users (37) to the said intermediate (32) via the said network;
   said intermediate (32) hides the content (37) of the sending user (33) and sends the resulted instant simultaneous message (31) to all the target users (35) wherein said resulted instant simultaneous message including the received instant simultaneous message from the sending user without the sending user's content;
   said target users (35) each sends its own content (37) according to the subject (36) to the intermediate (32) and the said content including target user's content of the instant simultaneous message (31);
   said intermediate (32) is continuing to receive contents of the said instant simultaneous message (31) from each of the target users (35) initially indicated by the said sending user and for each received said content of the said instant simultaneous message (31) from any of the target users updates the sending user and those target users who already sent their said content of the said instant simultaneous message (31) to the intermediate with the said received content.

20. The set of instructions as recited in claim 19, further comprising additional conditions to the instant simultaneous message (31) including computer instructed constraints or human controls or physical constraints or a combination of any wherein said physical constraints including expiry time.

* * * * *